(12) United States Patent
Rubin

(10) Patent No.: US 6,823,320 B1
(45) Date of Patent: Nov. 23, 2004

(54) AUTOMATED VALUATION SYSTEM AND METHOD

(76) Inventor: Marc Rubin, 274 Adams Hill Rd., Greenville, NH (US) 03048

( * ) Notice: Subject to any disclaimer, the term of this patent is extended or adjusted under 35 U.S.C. 154(b) by 474 days.

(21) Appl. No.: 09/649,812

(22) Filed: Aug. 28, 2000

(51) Int. Cl.$^7$ ............................................. G06F 17/60
(52) U.S. Cl. .............................. 705/400; 705/1; 705/7; 705/10
(58) Field of Search ............................. 705/1, 35, 36, 705/10, 37, 38, 7, 20, 28, 400

(56) References Cited

U.S. PATENT DOCUMENTS

| | | | | |
|---|---|---|---|---|
| 5,189,606 | A | | 2/1993 | Burns et al. .................. 705/10 |
| 5,361,201 | A | | 11/1994 | Jost et al. ...................... 705/35 |
| 5,546,564 | A | | 8/1996 | Horie ............................ 703/1 |
| 5,680,305 | A | | 10/1997 | Apgar, IV .................... 705/10 |
| 5,857,174 | A | * | 1/1999 | Dugan ........................... 705/1 |
| 5,960,407 | A | | 9/1999 | Vivona ......................... 705/10 |
| 6,035,287 | A | * | 3/2000 | Stallaert et al. ............... 705/37 |
| 6,321,205 | B1 | * | 11/2001 | Eder ............................. 705/7 |

FOREIGN PATENT DOCUMENTS

CA 2351595 A1 * 12/2001

OTHER PUBLICATIONS

Unknown Author, "Express Business Valuation", Accounting Technology, Oct. 2002, vol. 18, Issue 9, p48, 2p, 1 diagram, 3c.*

"Pricing Data: Global Listed Markets Data", 2001, available at http://www.ftinteractivedata.com/pdf/LM_Pricing-5520-0810.pdf.*

* cited by examiner

Primary Examiner—John G. Weiss
Assistant Examiner—Richard Woo
(74) Attorney, Agent, or Firm—Maine & Asmus

(57) ABSTRACT

An automated valuation system and method for: storing, in a database, a first feature element and an offered price for each of a plurality of specimens; generating, through the use of the first feature element and the offered price, a plurality of valuation coefficients, indicative of the actual value of each of the plurality of specimens; calculating, through the use of the plurality of valuation coefficients, the actual value of each of the plurality of specimens; and comparing, for each of the plurality of specimens, the actual value of the specimen to the offered price of the specimen to determine a cost indicator, wherein the cost indicator is indicative of the amount that the offered price of a specimen differs from the actual value of a specimen.

19 Claims, 4 Drawing Sheets

AUTOMATED VALUATION SYSTEM AND METHOD

FIELD OF THE INVENTION

This invention relates to an automated valuation system and method and more particularly to such a system and method which examines the offered price and the feature elements for each of a plurality of specimens and determines the amount that each specimen's offered price differs from the actual value of that specimen.

BACKGROUND OF THE INVENTION

Ever since people have been shopping, they have always been interested in obtaining the best possible deal for their money. Retail businesses realize this and publish flyers and advertisements touting the prices of the items they are selling. In the past, the prudent shopper would compile these sales flyers from various stores and compare the prices of the items listed for sale and shop at the business that they felt had the best bargains.

With the proliferation of computers and the internet, people have turned toward cyberspace to assist them in bargain hunting. The internet quickly became populated with websites from e-tailers (internet-based retailers). These websites advertised the bargains available from these internet businesses, much in the same way the paper-based sales flyers advertised the items available at traditional retail establishments.

As with paper-based technology, internet consumers began comparing the bargains available at various websites to seek out the best bargains. Several websites were established which allowed the consumer to select the item or product they were looking for and then have the website search various e-tailer websites, so that the consumer could comparison shop for the item(s) they were looking for at various merchant websites.

Unfortunately, these two methods of comparison shopping (paper and computer based) merely compare the selling prices of the item offered by various retailers. They do not analyze the selling price of the particular item to determine if the product offered for sale is actually worth its selling price. Moreover, since these comparison websites are typically used to compare identical products, they do not allow the user to compare the features available from different products. Further, in the event that the system is used to compare dissimilar products (so that the features of various products could be compared), the purpose of the price comparison is compromised. Additionally, in the event that the user utilizes one of these comparison websites to compare dissimilar products having varying features, the website will not analyze the specific features available in the product, with respect to price, to determine if the product is a good value.

SUMMARY OF THE INVENTION

It is therefore an object of this invention to provide an automated valuation system and method which allows the user to review and compare various items which are offered for sale.

It is a further object of this invention to provide such a system and method which allows the user to compare the individual features of each item.

It is a further object of this invention to provide such a system and method which allows the user to determine the actual value of the item offered for sale.

It is a further object of this invention to provide such a system and method which enables the user to determine the difference between the offered selling price of the item being sold and its actual value.

It is a further object of this invention to provide such a system and method which allows the user to determine the amount that the individual features of each item contribute to the actual selling price of the item.

It is a further object of this invention to provide such a system and method which allows the user to assess the level of confidence the user should afford the calculated values.

This invention results from the realization that a truly effective automated valuation system and method can be achieved by analyzing the offered price and features of a plurality of items offered for sale, so that the actual value of these individual items can be calculated and compared to the offered price of each item.

This invention features an automated valuation system including: a database containing a first feature element and an offered price for each of a plurality of specimens; a comparative valuation device, responsive to the first feature element and the offered price for each of the plurality of specimens, for generating a plurality of valuation coefficients, indicative of the actual value of each of the plurality of specimens; an actual value calculator, responsive to the comparative valuation device generating the plurality of valuation coefficients, for calculating the actual value of each of the plurality of specimens; and a price comparator for comparing, for each of the plurality of specimens, the actual value of the specimen to the offered price of the specimen to determine a cost indicator, wherein the cost indicator is indicative of the amount that the offered price of a specimen differs from the actual value of a specimen.

In a preferred embodiment, the automated valuation system may include a feature weighting device, responsive to the price comparator generating the cost indicator, for generating a correlation factor for the first feature element, indicative of the impact that the first feature element has on the actual value of each of the plurality of specimens. The comparative valuation device may include an offered price averaging system, responsive to the database, for determining an average offered price for the plurality of specimens. The comparative valuation device may include a first feature element averaging system, responsive to the database, for determining the average first feature element value for the plurality of specimens. The comparative valuation device may include a feature element square summing device for mathematically squaring each first feature element and summing these squared first feature elements, thus producing a first feature element squared sum. The comparative valuation device may include a product summing device for determining, for each of the plurality of specimens, the product of the offered price and the first feature element, and summing these products to produce a first feature element product sum. The comparative valuation device may utilize the average offered price, the average first feature element value, the first feature element squared sum, and the first feature element product sum, to determine the plurality of valuation coefficients. The comparative valuation device may include a simultaneous equation generation system for generating a plurality of simultaneous equations indicative of the plurality of valuation coefficients. The actual value calculator may include a best fit equation generator and the actual value calculator may utilize the plurality of valuation coefficients to produce a best-fit equation, which generates the actual value of each specimen in relation to its respective first feature element. The database may contain at least one additional feature element for each of the plurality of specimens, the comparative valuation device may generate an additional valuation coefficient for each additional feature element, and the correlation factor may be indicative of the impact that the first and the at least one additional feature element has on the actual value of each of the plurality of specimens.

This invention also features a method of automatically determining the actual value for each of a plurality of specimens, comprising the steps of: storing, in a database, a first feature element and an offered price for each of a plurality of specimens; generating, through the use of the first feature element and the offered price, a plurality of valuation coefficients, indicative of the actual value of each of the plurality of specimens; calculating, through the use of the plurality of valuation coefficients, the actual value of each of the plurality of specimens; and comparing, for each of the plurality of specimens, the actual value of the specimen to the offered price of the specimen to determine a cost indicator, wherein the cost indicator is indicative of the amount that the offered price of a specimen differs from the actual value of a specimen.

In a preferred embodiment, the method may include the step of generating a correlation factor for the first feature element, indicative of the impact that the first feature element has on the actual value of each of the plurality of specimens. The method may include the step of generating, in response to each specimen including additional feature elements, an additional valuation coefficient for each additional feature element.

This invention also features a processor and memory configured to perform the steps of: storing, in a database, a first feature element and an offered price for each of a plurality of specimens; generating, through the use of the first feature element and the offered price, a plurality of valuation coefficients, indicative of the actual value of each of the plurality of specimens; calculating, through the use of the plurality of valuation coefficients, the actual value of each of the plurality of specimens; and comparing, for each of the plurality of specimens, the actual value of the specimen to the offered price of the specimen to determine a cost indicator, wherein the cost indicator is indicative of the amount that the offered price of a specimen differs from the actual value of a specimen.

In a preferred embodiment, the processor and memory may be incorporated into a personal computer, a programmable logic controller, a single board computer, or an array of network servers.

This invention also features a computer readable medium having a plurality of instructions stored thereon which, when executed by the processor, cause that processor to perform the steps of: storing, in a database, a first feature element and an offered price for each of a plurality of specimens; generating, through the use of the first feature element and the offered price, a plurality of valuation coefficients, indicative of the actual value of each of the plurality of specimens; calculating, through the use of the plurality of valuation coefficients, the actual value of each of the plurality of specimens; and comparing, for each of the plurality of specimens, the actual value of the specimen to the offered price of the specimen to determine a cost indicator, wherein the cost indicator is indicative of the amount that the offered price of a specimen differs from the actual value of a specimen.

In a preferred embodiment, the computer readable medium may be a hard drive, a read-only memory, or a random-access memory.

DISCLOSURE OF THE PREFERRED EMBODIMENT

Other objects, features and advantages will occur to those skilled in the art from the following description of a preferred embodiment and the accompanying drawings, in which.

Figure 3:
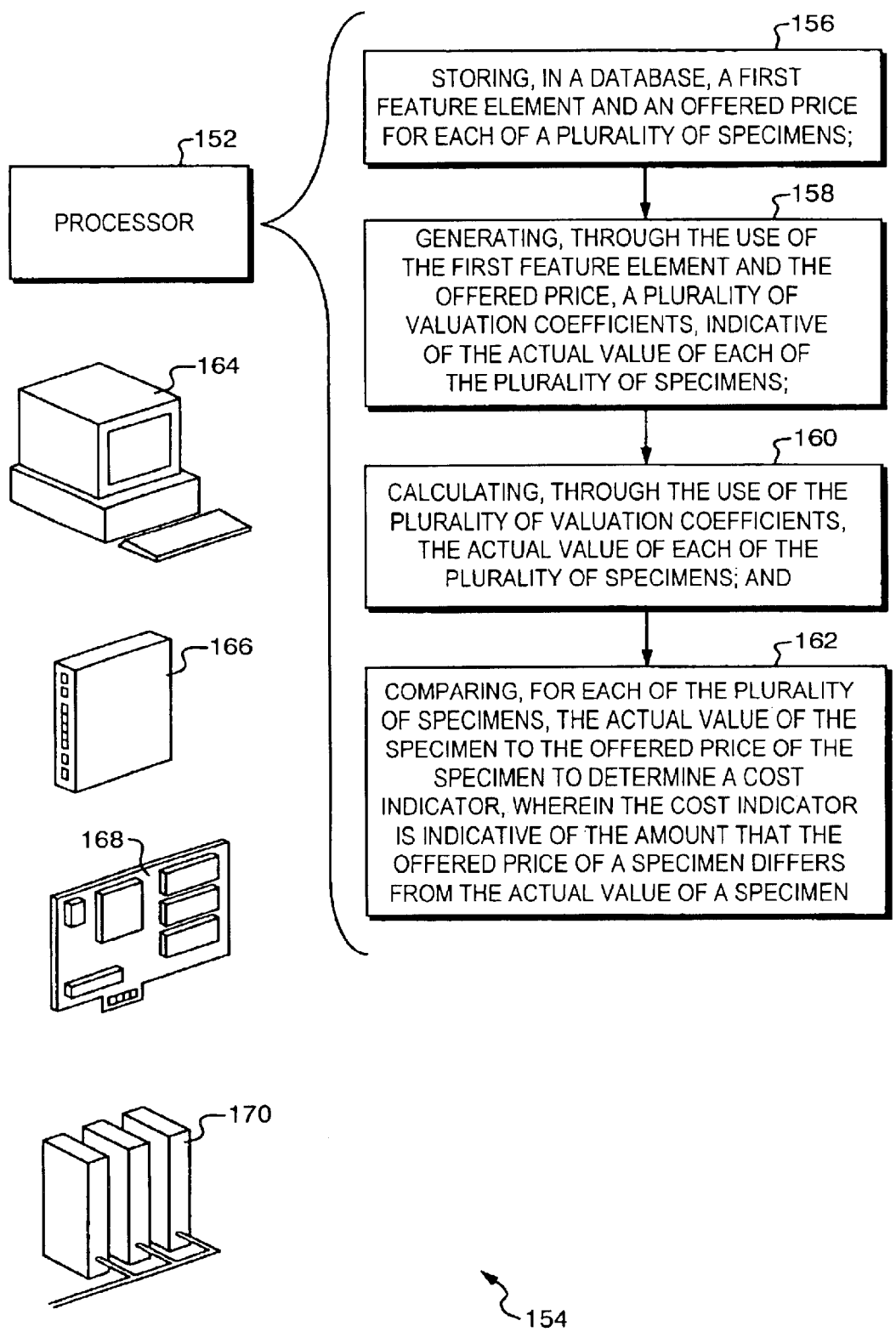
Figure 4:
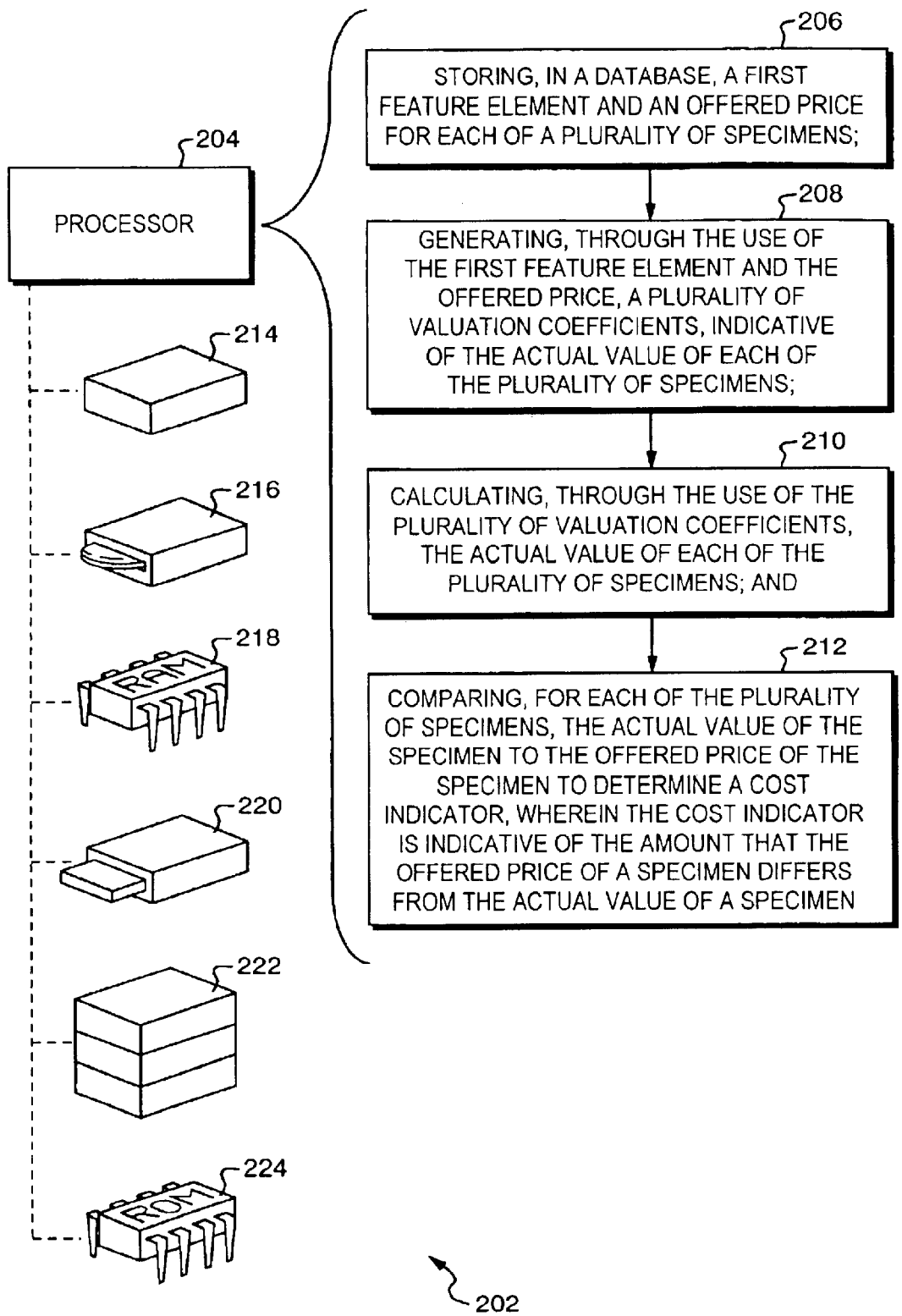

FIG. 3 is a diagrammatic view of another embodiment of the automated valuation system of this invention, including a processor and memory, and a flow chart showing the sequence of executed steps; and FIG. 4 is a diagrammatic view of another embodiment of the automated valuation system of this invention, including a processor and a computer readable medium, and a flow chart showing the sequence of executed steps.

Figure 1:
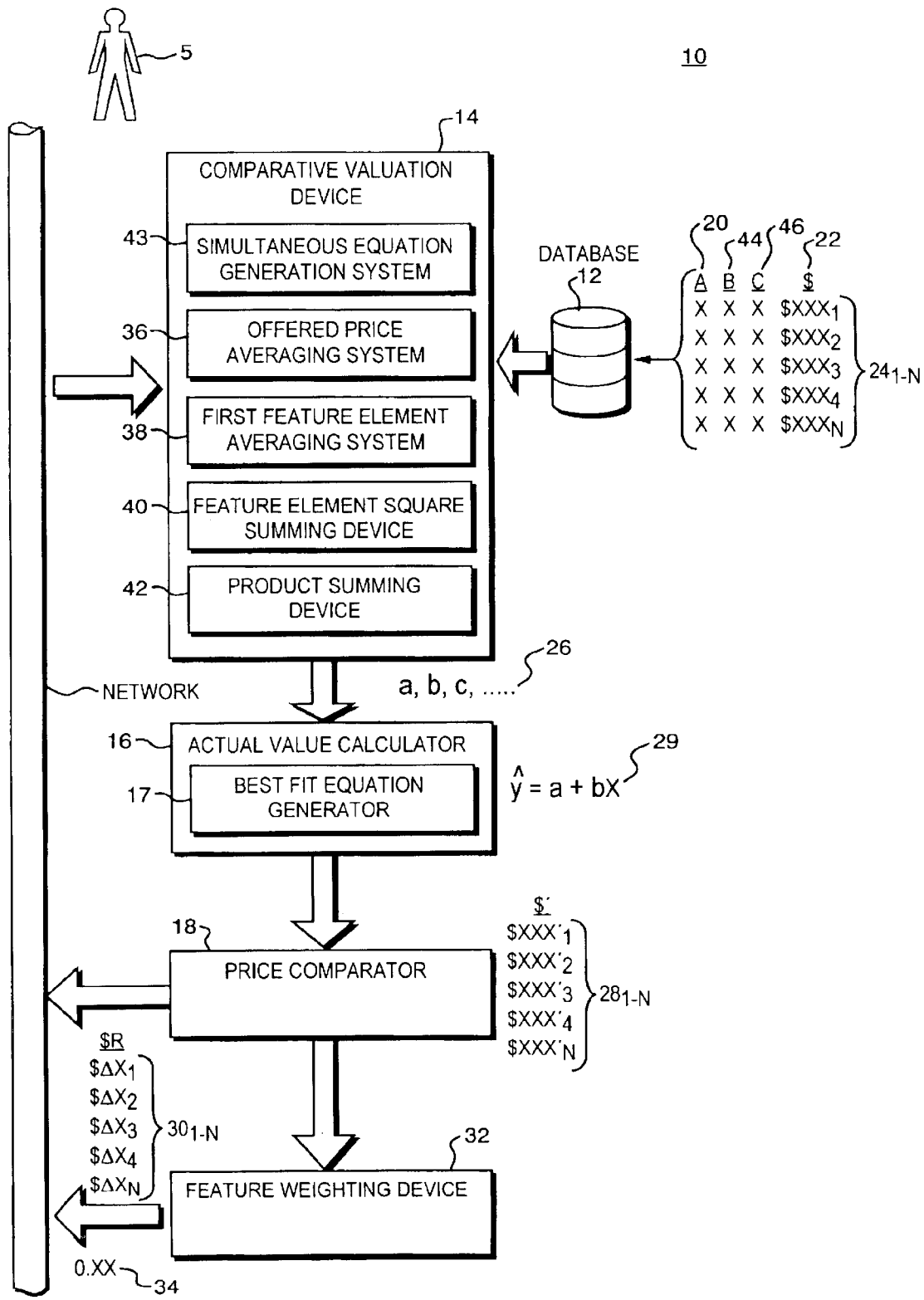
FIG. 1 is a diagrammatic view of the automated valuation system of this invention.

In accordance with this invention, the automated valuation system 10, FIG. 1, includes a database 12, a comparative valuation device 14, an actual value calculator 16, and a price comparator 18. Database 12 can be any database known to those of ordinary skill in the art, including Oracle™, Microsoft Access™, etc. Database 12 contains a first feature element 20 and an offered price 22 for a plurality of specimens $24_{1-n}$. Specimens $24_{1-n}$ would be similar products that are offered for sale by various retailers or sellers. Typical examples would be homes, cars, stereos, computers, etc. Feature element 20 would be a common feature found in relation to the object offered for sale. If the object is a home, typical features would be lot size, square footage of living space, whether it has hardwood floors, whether it has a fireplace, etc. If the object is a car, typical features would be engine size, fuel economy, whether it has a leather interior, etc. If the object is a computer, typical features would be hard drive size, monitor size, processor type, processor speed, etc.

Comparative valuation device 14, which is responsive to database 12 providing valuation device 14 with a plurality of specimens $24_{1-n}$, each containing a first feature element 20 and an offered price 22, generates a plurality of valuation coefficients 26 (shown as a, b, c . . . ) which are indicative of the actual value of each of the plurality of specimens $24_{1-n}$. A thorough explanation of the required calculations is provided below.

Actual value calculator 16, which includes a best fit equation generator 17, is responsive to comparative valuation device 14 generating valuation coefficients 26. Once valuation coefficients 26 are generated, actual value calculator 16 calculates the actual value $28_{1-n}$ for each of the plurality of specimens $24_{1-n}$ through the use of a best fit (or least squares) equation 29. Plurality of specimens $24_{1-n}$ includes an offered price 22 (in column "$") shown here as $xxx_1$, $xxx_2$, $xxx_3$, $XXX_4$, and $xxx_n$. Accordingly, the corresponding actual values $28_{1-n}$ (in column "$'"), as calculated by actual value calculator 16, are $xxx_1'$, $XXX_2'$, $xxx_3'$, $xxx_4'$, and $xxx_n'$. A thorough explanation of the required calculations is provided below.

A price comparator 18 compares, for each of the plurality of specimens $24_{1-n}$, the actual value $28_{1-n}$ of the plurality of specimens $24_{1-n}$ to its respective offered price 22 to determine a cost indicator $30_{1-n}$ for each of the plurality of specimens $24_{1-n}$, wherein the cost indicator $30_{1-n}$ is indicative of the amount that offered price 22 differs from the actual value $28_{1-n}$ of the specimen $24_{1-n}$. Typically, the cost indicator $30_{1-n}$ will be the difference between the actual value $28_{1-n}$ of the plurality of specimens $24_{1-n}$ and its respective offered price 22. A thorough explanation of the required calculations is provided below.

A feature weighting device 32, responsive to price comparator 18 generating cost indicator $30_{1-n}$, generates a correlation factor 34 which relates specifically to first feature element 20, where correlation factor 34 is indicative of the impact that first feature element 20 has on the actual value $28_{1-n}$ of each of the plurality of specimens $24_{1-n}$. A thorough explanation of the required calculations is provided below.

User 40 of automated valuation system 10 can access system 10 via any form of network, such as the internet, an intranet, or any standard local area network (Ethernet, Arcnet, Token Ring, etc.). Additionally, actual values $28_{1-n}$, cost indicators $30_{1-n}$, and correlation factor 34 can be provided to user 40 via the same network.

The following examples are provided which further explain the subject invention and the calculations performed.

EXAMPLE 1

A buyer is shopping for a house, where the information available to the buyer is the living space of the house (in square feet) and the offered price for the house. The buyer has eleven (11) houses to choose from as follows:

|  | Living Space (ft²) | Offered Price | (Living Space)² | Living Space * Price |
|---|---|---|---|---|
|  | 1,800 | $150,000 | 3,240,000 | $270,000,000 |
|  | 2,200 | $165,000 | 4,840,000 | $363,000,000 |
|  | 2,700 | $225,000 | 7,290,000 | $607,500,000 |
|  | 2,300 | $180,000 | 5,290,000 | $414,000,000 |
|  | 2,000 | $170,000 | 4,000,000 | $340,000,000 |
|  | 2,000 | $175,000 | 4,000,000 | $350,000,000 |
|  | 2,500 | $200,000 | 6,250,000 | $500,000,000 |
|  | 2,400 | $190,000 | 5,760,000 | $456,000,000 |
|  | 2,400 | $180,000 | 5,760,000 | $432,000,000 |
|  | 2,000 | $170,000 | 4,000,000 | $340,000,000 |
|  | 3,000 | $250,000 | 9,000,000 | $750,000,000 |
| average | 2,300 | $186,818 sum | 59,430,000 | $4,822,500,000 |

As shown in the above table, database 12 stores plurality of specimens $24_{1-n}$ which includes eleven (11) discrete specimens which represent the eleven (11) houses the buyer is considering purchasing. Comparative valuation device 14 generates the plurality of valuation coefficients 26 by processing the information (the price and square footage) provided concerning these eleven (11) homes, which corresponds to the offered price 22 and first feature element 20 of the plurality of specimens.

As stated above, comparative valuation calculator 14 produces valuation coefficients 26 which are indicative of the actual value of each of the plurality of specimens $24_{1-n}$. In a two-dimensional system (a system that has only two variables, e.g., an offered price and square footage), these coefficients 26 are actually the slope (b) and the y-intercept (a) of the best fit (or least squares) equation for that particular series of data points. A best fit (or least squares) equation is the mathematical equation for a line that can be plotted through a series of data points, where this equation provides the best mathematical approximation for that series of points. The equation for this best fit (or least squares) line for two-dimensional data is as follows:

$$\hat{Y}=a+bX \quad \text{(Equation 1)}$$

where the slope (b) and y-intercept (a) are calculated as follows:

$$b = \frac{\sum XY - n\overline{X}\overline{Y}}{\sum X^2 - n\overline{X}^2} \quad \text{(Equation 2)}$$

$$a=\overline{Y}-b\overline{X} \quad \text{(Equation 3)}$$

Please note that:

n=the number of specimens available (in this example, there are eleven specimens and, therefore, "n" is equal to (11);

X=the values of the X variable (in this example, the living space);

Y=the values of the Y variable (in this example, the offered price);

$\overline{X}$=the average value for the X variable (in this example, the living space); and $\overline{Y}$=the average value for the Y variable (in this example, the offered price).

The best fit (or least squares) equation (Equation 1) is generated by best fit equation generator 17 and is used by actual value calculator 16 to determine the actual value $28_{1-n}$ for each of the plurality of specimens $24_{1-n}$. Therefore, in order to determine the best fit (or least squares) equation for the specimens available (in this example, the eleven homes), the slope (b) and y-intercept (a) (which are the coefficients 26 used by actual value calculator 16) must first be calculated (pursuant to Equations 2 & 3). Additionally, in order to determine the slope (b), the following must be determined: the average value of the living space; and the average value of the offered price.

Comparative valuation device 14 includes an offered price averaging system 36, responsive to database 12, which determines the average offered price ($\overline{Y}$) of the plurality of specimens $24_{1-n}$ (the houses offered for sale). In this particular example, the average offered price of the eleven houses offered for sale is $186,818. Comparative valuation device 14 includes a first feature element averaging system 38, responsive to database 12, which determines the average first feature element value ($\overline{X}$) of the plurality of specimens $24_{1-n}$ (the houses offered for sale). In this particular example, the average first feature element value (the average square footage) of the eleven house offered for sale is 2,300 square feet.

Comparative valuation device 14 includes a feature element square summing device 40 for mathematically squaring the value of each first feature element 20 and summing those squared first feature elements, thus producing a first feature element squared sum. This is represented by $\sum X^2$ from Equation 2. Referring to the table above, the individual first feature elements (shown in column 1) are squared and these squared first feature elements (shown in column 3) are then summed. In this particular example, the sum of these individual squared first feature elements is 59,430,000.

Product summing device 42, included in comparative valuation device 14, determines for each of the plurality of specimens (the eleven houses offered for sale) the product (shown in column 4) of the offered price (shown in column 2) and the first feature element (shown in column 1). These individual products (for each offered price/living space) are then summed to produce a first feature element product sum. This is represented by $\sum XY$ from Equation 2. In this particular example, the first feature element product sum is 4,822,500,000.

The slope (b) of the best fit (or least squares) equation (Equation 1) can now be calculated by utilizing Equation 2 as follows:

$$b = \frac{4,822,500,000 - (11)(2300)(186,818)}{59,430,000 - (11)(2300)^2}$$

$$b = 77.42$$

Once (b) is calculated, (a) can be calculated through the use of Equation 3 as follows:

$$a = 186,818 - (77.42)(2300)$$

$$a = 8753.67$$

Accordingly, the best fit equation 29, pursuant to Equation 1, for the data shown in the above table, is:

$$\hat{Y} = 8753.67 + 77.42X \qquad \text{(Equation 4)}$$

This shows that the value of each home is equivalent to a base price of $8,753.67 plus $77.42 for each square foot of living space. Now that the best fit (or least squares) equation 29 has been determined by actual value calculator 16, the value of the living space (the X variable) can be inserted into the best fit equation (Equation 4) to determine the actual value $28_{1-n}$ (the $\hat{Y}$ variable) of each of the plurality of specimens $24_{1-n}$. The below table itemizes those calculations as performed by actual value calculator 16:

| Living Space (ft²) | Offered Price | Actual Value | Cost Indicator |
|---|---|---|---|
| 1,800 | $150,000 | $148,108.50 | $1,891.50 |
| 2,200 | $165,000 | $179,076.25 | −$14,076.25 |
| 2,700 | $225,000 | $217,785.92 | $7,214.08 |
| 2,300 | $180,000 | $186,818.18 | −$6,818.18 |
| 2,000 | $170,000 | $163,592.38 | $6,407.62 |
| 2,000 | $175,000 | $163,592.38 | $11,407.62 |
| 2,500 | $200,000 | $202,302.05 | −$2,302.05 |
| 2,400 | $190,000 | $194,560.12 | −$4,560.12 |
| 2,400 | $180,000 | $194,560.12 | −$14,560.12 |
| 2,000 | $170,000 | $163,592.38 | $6,407.62 |
| 3,000 | $250,000 | $241,011.73 | $8,988.27 |

The actual values calculated above (Column 3) represents the value of the individual homes (the eleven specimens) as calculated through the use of the best fit equation (Equation 4). Price comparator 18 will then compare these actual values $28_{1-n}$ to the offered price 22 of each of the plurality of specimens $24_{1-n}$ to determine a cost indicator $30_{1-n}$ for each of the plurality of specimens $24_{1-n}$. As stated above, the cost indicator $30_{1-n}$ will typically be the difference between the actual value $28_{1-n}$ of each of the plurality of specimens $24_{1-n}$ and its respective offered price 22. As can be seen from the table above, a negative cost indicator is indicative of an offered price which is less than the actual value of the item. Accordingly, this is a good buy. Additionally, a positive cost indicator is indicative of an offered price which is greater than the actual value of the item. Therefore, this is a bad buy. Naturally, the choice to make a negative cost indicator indicative of a good buy is for illustrative purposes only and is not intended to be a limitation of this invention, as a good buy may be indicated by a positive cost indicator.

Now that price comparator 18 has calculated a cost indicator $30_{1-n}$ for each of the plurality of specimens $24_{1-n}$ feature weighting device 32 can generate correlation factor 34 (r) which, as stated above, is indicative of the impact that first feature element 20 has on the actual value $28_{1-n}$ of each of the plurality of specimens $24_{1-n}$. In this particular example, it is indicative of the impact that a house's square footage has on the value of that house.

Correlation factor 34 is calculated using the following equation:

$$r = \sqrt{1 - \sum \frac{(y - \hat{y})^2}{(y - \bar{y})^2}} \qquad \text{(Equation 5)}$$

The below table itemizes those calculations as performed by feature weighting device 32:

| offered − average $(y - \bar{y})$ | (offered − average)² $(y - \bar{y})^2$ | offered − actual $(y - \hat{y})$ | (offered − actual)² $(y - \hat{y})^2$ |
|---|---|---|---|
| −$36,818.18 | $1,355,578,512.40 | $1,891.50 | $3,577,755.61 |
| −$21,818.18 | $476,033,057.85 | −$14,076.25 | $198,140,710.86 |
| $38,181.82 | $1,457,851,239.67 | $7,214.08 | $52,042,896.09 |
| −$6,818.18 | $46,487,603.31 | −$6,818.18 | $46,487,603.31 |
| −$16,818.18 | $282,851,239.67 | $6,407.62 | $41,057,653.44 |
| −$11,818.18 | $139,669,421.49 | $11,407.62 | $130,133,899.78 |
| $13,181.82 | $173,760,330.58 | −$2,302.05 | $5,299,447.03 |
| $3,181.82 | $10,123,966.94 | −$4,560.12 | $20,794,669.81 |
| −$6,818.18 | $46,487,603.31 | −$14,560.12 | $211,997,015.85 |
| −$16,818.18 | $282,851,239.67 | $6,407.62 | $41,057,653.44 |
| $63,181.82 | $3,991,942,148.76 | $8,988.27 | $80,788,993.90 |
| sum | $8,263,636,363.64 | | $831,378,299.12 |

$$r = \sqrt{1 - \frac{831,378,299.12}{8,263,636,363.64}}$$

$$r = 0.9484$$

In this particular example, the correlation factor 34 (r) has a value which is quite close to 1.00, showing that there is a high level of correlation. Therefore, the size of the house (the square footage) has a large impact on the actual value of the house.

Further examples are provided for illustrative purposes only. However, they are provided in a more compact format which simply summarizes the calculations in tabular form.

EXAMPLE 2

A buyer is shopping for a house, where the information available to the buyer is the lot size (in acres) and the offered price for the house. As above, the buyer has eleven (11) houses to choose from and they are as follows:

| Lot Size (acres) | Offered Price | (Lot Size)² | Lot Size * Price |
|---|---|---|---|
| 1.20 | $150,000 | 1.44 | $180,000 |
| 1.50 | $165,000 | 2.25 | $247,500 |
| 1.70 | $225,000 | 2.89 | $382,500 |
| 1.00 | $180,000 | 1.00 | $180,000 |
| 1.00 | $170,000 | 1.00 | $170,000 |
| 1.30 | $175,000 | 1.69 | $227,500 |
| 1.80 | $200,000 | 3.24 | $360,000 |
| 1.40 | $190,000 | 1.96 | $266,000 |
| 2.00 | $180,000 | 4.00 | $360,000 |
| 1.10 | $170,000 | 1.21 | $187,000 |
| 7.00 | $250,000 | 49.00 | $1,750,000 |
| average 1.91 | $186,818 sum | 69.68 | $4,310,500 |

$$b = \frac{4,310,500 - (11)(1.91)(186,818)}{69.68 - (11)(1.91)^2}$$

$$b = 13089.90$$

Once (b) is calculated, (a) can be calculated through the use of Equation 3 as follows:

$$a = 186{,}818 - (13089.90)(1.91)$$
$$a = 161{,}828.38$$

Accordingly, the best fit equation 29, pursuant to Equation 1, for the data shown in the above table, is:

$$\hat{Y} = 161{,}828.38 + 13089.90X \quad \text{(Equation 6)}$$

This shows that the value of each home is equivalent to a base price of $161,828.38 plus $13,089.90 for each acre of land. Actual value calculator 16 can now calculate the actual value $28_{1-n}$ for the plurality of specimens $24_{1-n}$. Once this is done, price comparator 18 can then calculate the cost indicator $30_{1-n}$ for each of the plurality of specimens $24_{1-n}$. These calculations are summarized as follows:

| Lot Size (acres) | Offered Price | Actual Value | Cost Indicator |
| --- | --- | --- | --- |
| 1.20 | $150,000 | $177,536.25 | -$27,536.25 |
| 1.50 | $165,000 | $181,463.22 | -$16,463.22 |
| 1.70 | $225,000 | $184,081.20 | $40,918.80 |
| 1.00 | $180,000 | $174,918.27 | $5,081.73 |
| 1.00 | $170,000 | $174,918.27 | -$4,918.27 |
| 1.30 | $175,000 | $178,845.24 | -$3,845.24 |
| 1.80 | $200,000 | $185,390.19 | $14,609.81 |
| 1.40 | $190,000 | $180,154.23 | $9,845.77 |
| 2.00 | $180,000 | $188,008.17 | -$8,008.17 |
| 1.10 | $170,000 | $176,227.26 | -$6,227.26 |
| 7.00 | $250,000 | $253,457.66 | -$3,457.66 |

The below table itemizes the calculations as performed by feature weighting device

| H.W. Floors (1,0) | Offered Price | (H.W. Floors)$^2$ | H.W. Floors * Price |
| --- | --- | --- | --- |
| 0 | $150,000 | 0.00 | $0 |
| 0 | $165,000 | 0.00 | $0 |
| 1 | $225,000 | 1.00 | $225,000 |
| 1 | $180,000 | 1.00 | $180,000 |
| 0 | $170,000 | 0.00 | $0 |
| 0 | $175,000 | 0.00 | $0 |
| 1 | $200,000 | 1.00 | $200,000 |
| 1 | $190,000 | 1.00 | $190,000 |
| 0 | $180,000 | 0.00 | $0 |
| 1 | $170,000 | 1.00 | $170,000 |
| 1 | $250,000 | 1.00 | $250,000 |
| average 0.55 | $186,818 | sum 6.00 | $1,215,000 |

$$b = \frac{1{,}215{,}000 - (11)(0.55)(186{,}818)}{6.00 - (11)(0.55)^2}$$

$$b = 34{,}500.00$$

Once (b) is calculated, (a) can be calculated through the use of Equation 3 as follows:

$$a = 186{,}818 - (34{,}500.00)(0.55)$$
$$a = 168{,}000.00$$

Accordingly, the best fit equation 29, pursuant to Equation 1, for the data shown in the above table, is:

$$\hat{Y} = 168{,}000.00 + 34{,}500.00X \quad \text{(Equation 7)}$$

This shows that the value of each home is equivalent to a base price of $168,000.00 plus an additional $4,500.00 if the

| offered − average $(y - \bar{y})$ | (offered − average)$^2$ $(y - \bar{y})^2$ | offered − actual $(y - \hat{y})$ | (offered − actual)$^2$ $(y - \hat{y})^2$ |
| --- | --- | --- | --- |
| -$36,818.18 | $1,355,578,512.40 | -$27,536.25 | $ 758,245,292.49 |
| -$21,818.18 | $ 476,033,057.85 | -$16,463.22 | $ 271,037,729.55 |
| $38,181.82 | $1,457,851,239.67 | $40,918.80 | $1,674,347,935.97 |
| -$ 6,818.18 | $ 46,487,603.31 | $ 5,081.73 | $ 25,823,933.57 |
| -$16,818.18 | $ 282,851,239.67 | -$ 4,918.27 | $ 24,189,424.53 |
| -$11,818.18 | $ 139,669,421.49 | -$ 3,845.24 | $ 14,785,901.02 |
| $13,181.82 | $ 173,760,330.58 | $14,609.81 | $ 213,446,462.16 |
| $ 3,181.82 | $ 10,123,966.94 | $ 9,845.77 | $ 96,939,113.11 |
| -$ 6,818.18 | $ 46,487,603.31 | -$ 8,008.17 | $ 64,130,827.51 |
| -$16,818.18 | $ 282,851,239.67 | -$ 6,227.26 | $ 38,778,821.26 |
| $63,181.82 | $3,991,942,148.76 | -$ 3,457.66 | $ 11,955,430.17 |
| sum | $8,263,636,363.64 | | $3,193,680,871.33 |

$$r = \sqrt{1 - \frac{3{,}193{,}680{,}871.33}{8{,}263{,}636{,}363.64}}$$

$$r = 0.7833$$

In this particular example, the correlation factor 34 (r) has a value which is moderately close to 1.00, showing that there is a moderate level of correlation. Therefore, the size of the lot (the acreage) has a moderate impact on the actual value of the house.

EXAMPLE 3

A buyer is shopping for a house, where the information available to the buyer is the offered price for the house and whether the house has hardwood floors. As above, the buyer has eleven (11) houses to choose from and they are as follows:

home has hardwood floors. Actual value calculator 16 can now calculate the actual value $28_{1-n}$ for the plurality of specimens $24_{1-n}$. Once this is done, price comparator 18 can then calculate the cost indicator $30_{1-n}$ for each of the plurality of specimens $24_{1-n}$. These calculations are summarized as follows:

| H.W. Floors (1,0) | Offered Price | Actual Value | Cost Indicator |
| --- | --- | --- | --- |
| 0.00 | $150,000 | $168,000.00 | -$18,000.00 |
| 0.00 | $165,000 | $168,000.00 | -$3,000.00 |

-continued

| H.W. Floors (1,0) | Offered Price | Actual Value | Cost Indicator |
|---|---|---|---|
| 1.00 | $225,000 | $202,500.00 | $22,500.00 |
| 1.00 | $180,000 | $202,500.00 | −$22,500.00 |
| 0.00 | $170,000 | $168,000.00 | $2,000.00 |
| 0.00 | $175,000 | $168,000.00 | $7,000.00 |
| 1.00 | $200,000 | $202,500.00 | −$2,500.00 |
| 1.00 | $190,000 | $202,500.00 | −$12,500.00 |
| 0.00 | $180,000 | $168,000.00 | $12,000.00 |
| 1.00 | $170,000 | $202,500.00 | −$32,500.00 |
| 1.00 | $250,000 | $202,500.00 | $47,500.00 |

The below table itemizes the calculations as performed by feature weighting device

| offered − average $(y - \bar{y})$ | (offered − average)$^2$ $(y - \bar{y})^2$ | offered − actual $(y - \hat{y})$ | (offered − actual)$^2$ $(y - \hat{y})^2$ |
|---|---|---|---|
| −$36,818.18 | $1,355,578,512.40 | −$18,000.00 | $ 324,000,000.00 |
| −$21,818.18 | $ 476,033,057.85 | −$ 3,000.00 | $ 9,000,000.00 |
| $38,181.82 | $1,457,851,239.67 | $22,500.00 | $ 506,250,000.00 |
| −$ 6,818.18 | $ 46,487,603.31 | −$22,500.00 | $ 506,250,000.00 |
| −$16,818.18 | $ 282,851,239.67 | $ 2,000.00 | $ 4,000,000.00 |
| −$11,818.18 | $ 139,669,421.49 | $ 7,000.00 | $ 49,000,000.00 |
| $13,181.82 | $ 173,760,330.58 | −$ 2,500.00 | $ 6,250,000.00 |
| $ 3,181.82 | $ 10,123,966.94 | −$12,500.00 | $ 156,250,000.00 |
| −$ 6,818.18 | $ 46,487,603.31 | $12,000.00 | $ 144,000,000.00 |
| −$16,818.18 | $ 282,851,239.67 | −$32,500.00 | $1,056,250,000.00 |
| $63,181.82 | $3,991,942,148.76 | $47,500.00 | $2,256,250,000.00 |
| sum | $8,263,636,363.64 | | $5,017,500,000.00 |

$$r = \sqrt{1 - \frac{5,017,500,000.00}{8,263,636,363.64}}$$

$r = 0.6268$

In this particular example, the correlation factor 34 (r) has a value which is distant from 1.00, showing that there is a lower level of correlation. Therefore, when compared to the impact that square footage and acreage have, the presence of hardwood floors has a lower impact on the actual value of the house.

While thus far we have only discussed systems that have an offered price and one feature element, this is not intended to be a limitation of the invention and was done solely to aid in the understanding of the subject invention. In the previous examples, we have shown a buyer who had to choose between eleven houses, where they only knew about one feature element for each house, namely: the size of the home; the size of the lot; or the presence of hardwood floors. Typically, the buyer would know of two or more feature elements. Therefore, database 12 may contain at least one additional feature element 44 (shown as column "B"). As stated earlier, these feature elements are indicative of the features (house size, lot size, etc.) included in the product being considered for purchase. As explained above, automated valuation system 10 generates the actual values 28$_{1-n}$ of the plurality of specimens 24$_{1-n}$, by generating a best fit (or least squares) equation 29 which calculates that actual value. This best fit equation 29 (in a single feature element system) is a two-dimensional equation which contains a y-intercept and a slope. These two values correspond to the valuation coefficients 26 generated by comparative valuation device 14. When additional features 44 and 46 are added to each of the plurality of specimens 24$_{1-n}$ an additional valuation coefficient must be generated for each additional feature element. These additional valuation coefficients are generated by comparative valuation device 14 for use by actual value calculator 16.

Accordingly, a plurality of specimens with one feature element requires, as shown above, two valuation coefficients. Further, a plurality of specimens with two feature elements requires three valuation coefficients, a plurality of specimens with three feature elements requires four valuation coefficients, and so on. These coefficients can be determined by generating a plurality of simultaneous equations, one equation for each unknown. Therefore, if you have two feature elements, you will have three valuation coefficients and will require three equations to solve for the three unknown valuation coefficients. Further, if you have three feature elements, you will have four valuation coefficients and will require four equations to solve for the four unknown valuation coefficients. As stated above, these valuation coefficients are generated by comparative valuation device 14 and, therefore, comparative valuation device 14 generates the required simultaneous equations to determine these coefficients. The general format of the equations which must be simultaneously solved by comparative valuation device 14 are as follows:

$$\sum Y = an + b\sum X_1 + c\sum X_2 + d\sum X_3 + \ldots z\sum X_z$$

$$\sum X_1 Y = a\sum X_1 + b\sum X_1 X_1 + c\sum X_2 X_1 + d\sum X_3 X_1 + \ldots z\sum X_z X_1$$

$$\sum X_2 Y = a\sum X_2 + b\sum X_1 X_2 + c\sum X_2 X_2 + d\sum X_3 X_2 + \ldots z\sum X_z X_2$$

$$\sum X_3 Y = a\sum X_3 + b\sum X_1 X_3 + c\sum X_2 X_3 + d\sum X_3 X_3 + \ldots z\sum X_z X_3$$

$$\vdots$$

$$\sum X_z Y = a\sum X_z + b\sum X_1 X_z + c\sum X_2 X_z + d\sum X_3 X_z + \ldots z\sum X_z X_z$$

where $n \geq z + 2$

EXAMPLE 4

A buyer is shopping for a house, where the information available to the buyer is the living space of the house (in square feet), the lot size of the house (in acres) and the offered price for the house. The buyer has eleven (11) houses to choose from as follows:

| Living Space (ft²) (X₁) | Lot Size (acres) (X₂) | Offered Price (Y) |
|---|---|---|
| 1,800 | 1.20 | $150,000 |
| 2,200 | 1.50 | $165,000 |
| 2,700 | 1.70 | $225,000 |
| 2,300 | 1.00 | $180,000 |
| 2,000 | 1.00 | $170,000 |
| 2,000 | 1.30 | $175,000 |
| 2,500 | 1.80 | $200,000 |
| 2,400 | 1.40 | $190,000 |
| 2,400 | 2.00 | $180,000 |
| 2,000 | 1.10 | $170,000 |
| 3,000 | 7.00 | $250,000 |
| sum 25,300 | 21.00 | $2,055,000 |

Accordingly, the model equations required by comparative valuation device 14 to determine the three required valuation coefficients 26 are as follows:

$$\Sigma Y = an + b\Sigma X_1 + c\Sigma X_2 \quad \text{(Equation 8)}$$

$$\Sigma X_1 Y = a\Sigma X_1 + b\Sigma X_1 X_1 + c\Sigma X_2 X_1 \quad \text{(Equation 9)}$$

$$\Sigma X_2 Y = a\Sigma X_2 + b\Sigma X_1 X_2 + c\Sigma X_2 X_2 \quad \text{(Equation 10)}$$

These three above-listed equations (Equations 8, 9 and 10) are generated by simultaneous equation generation system 43 (included in comparative valuation device 14), where these equations are indicative of the plurality of valuation coefficients 26. Inserting the data from the table above into Equations 8, 9 & 10 provides the following three (3) equations which must be solved simultaneously to determine the value of valuation coefficients 26:

$$2,055,000 = 11(a) + 25,300(b) + 21(c)$$

$$4,822,500,00 = 25,300(a) + 59,430,000(b) + 52,810(c)$$

$$4,310,500 = 21(a) + 52,810(b) + 69.68(c)$$

The three equations listed above can now be solved, using standard matrix algebra, to determine the value of valuation coefficients (a), (b), and (c). Comparative valuation device 14 will now solve for these three valuation coefficients 26, resulting in the following: (a)=27,436.64, (b)=66.89, and (c)=2893.79.

Therefore, the best fit (or least squares) equation is as follows:

$$\hat{Y} = 27,436.64 + 66.89 X_1 + 2893.79 X_2 \quad \text{(Equation 11)}$$

This shows that the value of each home is equivalent to a base price of $27,436.64 plus $66.89 for each square foot of living space and $2,893.79 for each acre of land. Actual value calculator 16 can now calculate the actual value $28_{1-n}$ for the plurality of specimens $24_{1-n}$. Once this is done, price comparator 18 can calculate the cost indicator $30_{1-n}$ for each of the plurality of specimens $24_{1-n}$. These calculations are summarized as follows:

| Living Space (ft²) | Lot Size (acres) | Offered Price | Actual Value | Cost Indicator |
|---|---|---|---|---|
| 1,800 | 1.20 | $150,000 | $151,311.19 | -$1,311.19 |
| 2,200 | 1.50 | $165,000 | $178,935.33 | -$13,935.33 |
| 2,700 | 1.70 | $225,000 | $212,959.08 | $12,040.92 |
| 2,300 | 1.00 | $180,000 | $184,177.43 | -$4,177.43 |
| 2,000 | 1.00 | $170,000 | $164,110.43 | $5,889.57 |
| 2,000 | 1.30 | $175,000 | $164,978.57 | $10,021.43 |
| 2,500 | 1.80 | $200,000 | $199,870.46 | $129.54 |
| 2,400 | 1.40 | $190,000 | $192,023.95 | -$2,023.95 |
| 2,400 | 2.00 | $180,000 | $193,760.22 | -$13,760.22 |
| 2,000 | 1.10 | $170,000 | $164,399.81 | $5,600.19 |
| 3,000 | 7.00 | $250,000 | $248,363.17 | $1,636.83 |

The below table itemizes the calculations as performed by feature weighting device 32:

| offered − average ($y - \bar{y}$) | (offered − average)² ($(y - \bar{y})^2$) | offered − actual ($y - \hat{y}$) | (offered − actual)² ($(y - \hat{y})^2$) |
|---|---|---|---|
| −$36,818 | $1,355,578,512.40 | −$1,311.19 | $1,719,213.97 |
| −$21,818 | $476,033,057.85 | −$13,935.33 | $194,193,282.86 |
| $38,182 | $1,457,851,239.67 | $12,040.92 | $144,983,682.20 |
| −$6,818 | $46,487,603.31 | −$4,177.43 | $17,450,921.40 |
| −$16,818 | $282,851,239.67 | $5,889.57 | $34,687,034.78 |
| −$11,818 | $139,669,421.49 | $10,021.43 | $100,429,119.37 |
| $13,182 | $173,760,330.58 | $129.54 | $16,780.09 |
| $3,182 | $10,123,966.94 | −$2,023.95 | $4,096,357.41 |
| −$6,818 | $46,487,603.31 | −$13,760.22 | $189,343,654.45 |
| −$16,818 | $282,851,239.67 | $5,600.19 | $31,362,139.24 |
| $63,182 | $3,991,942,148.76 | $1,636.83 | $2,679,212.45 |
| sum | $8,263,636,363.64 | | $720,961,398.23 |

$$r = \sqrt{1 - \frac{720,961,212.45}{8,263,636,363.64}}$$

$$r = 0.9554$$

In this particular example, the correlation factor 34 (r) has a value which is very close to 1.00, showing that there is a very high level of correlation. Please note that this correlation factor is higher than the 0.9484 correlation factor calculated for square footage alone (Example 1). Therefore, the size of the house in combination with the size of the lot have a very large impact on the actual value of the house.

The coefficient of determination ($r^2$) can now be calculated which illustrates the percentage of price variation explained by or attributable to the combination of multiple X variables (in this case, square footage and acreage). In this particular example, the coefficient of determination ($r^2$) is 0.9127.

Figure 2:
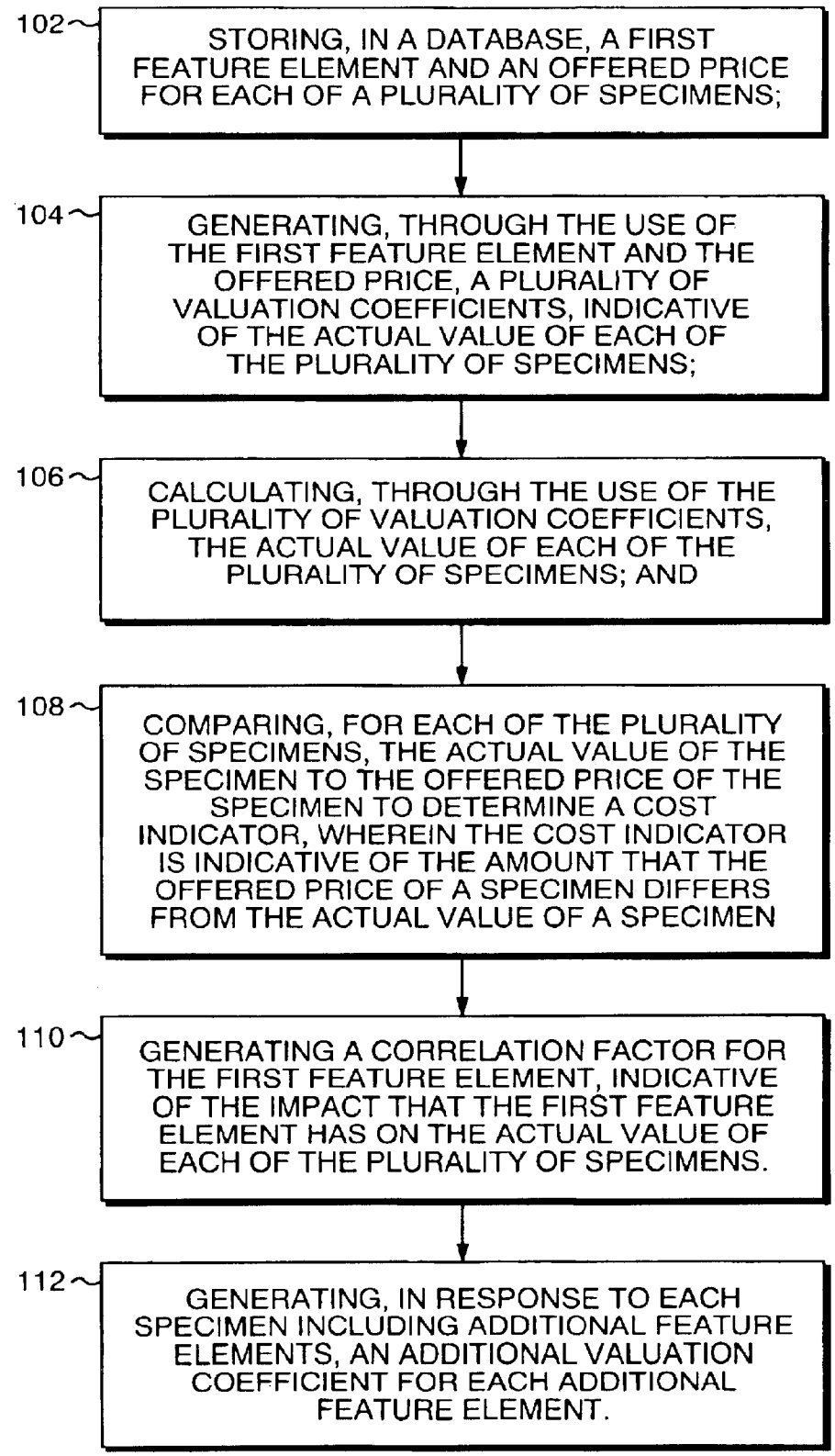
FIG. 2 is a flow chart of the method for automatically determining the actual value for each of a plurality of specimens, according to this invention.

Another embodiment of this invention is the method 100, FIG. 2, for automatically determining the actual value of each of a plurality of specimens, which includes the steps of storing 102, in a database, a first feature element and an offered price for each of a plurality of specimens. Method 100 generates 104, through the use of the first feature element and the offered price, a plurality of valuation coefficients, indicative of the actual value of each of the plurality of specimens. Method 100 calculates 106, through the use of the plurality of valuation coefficients, the actual value of each of the plurality of specimens. A comparison 108 is made, for each of the plurality of specimens, which compares the actual value of the specimen to the offered price of the specimen to determine a cost indicator, wherein the cost indicator is indicative of the amount that the offered price of a specimen differs from the actual value of a specimen.

Method 100 for automatically determining the actual value of each of a plurality of specimens includes the step of generating 110 a correlation factor for the first feature element, indicative of the impact that the first feature element has on the actual value of each of the plurality of specimens. Method 100 includes the step of generating 112, in response to each specimen including additional feature elements, an additional valuation coefficient for each additional feature element.

Another embodiment of the automated valuation system 150, FIG. 3, includes a processor 152 and memory 154 configured to perform the steps of: storing 156, in a database, a first feature element and an offered price for each of a plurality of specimens; generating 158, through the use of the first feature element and the offered price, a plurality of valuation coefficients, indicative of the actual value of each of the plurality of specimens; calculating 160, through the use of the plurality of valuation coefficients, the actual value of each of the plurality of specimens; and comparing 162, for each of the plurality of specimens, the actual value of the specimen to the offered price of the specimen to determine a cost indicator, wherein the cost indicator is indicative of the amount that the offered price of a specimen differs from the actual value of a specimen.

The processor 152 and memory 154 may be incorporated into: a personal computer 164; a programmable logic controller 166; a single board computer 168; or an array of network servers 170.

Another embodiment of the automated valuation system 200, FIG. 4, includes a computer readable medium 202 having a plurality of instructions stored thereon which, when executed by the processor 204, cause the processor to perform the steps of: storing 206, in a database, a first feature element and an offered price for each of a plurality of specimens; generating 208, through the use of the first feature element and the offered price, a plurality of valuation coefficients, indicative of the actual value of each of the plurality of specimens; calculating 210, through the use of the plurality of valuation coefficients, the actual value of each of the plurality of specimens; and comparing 212, for each of the plurality of specimens, the actual value of the specimen to the offered price of the specimen to determine a cost indicator, wherein the cost indicator is indicative of the amount that the offered price of a specimen differs from the actual value of a specimen.

Typical embodiments of computer readable medium 202 are: hard drive 214; optical drive 216; random access memory 218; tape drive 220; RAID array 222; and read only memory 224.

It should be appreciated that these are only a few embodiments of the specific invention and that this invention and method could be constructed using any combination of hardware/firmware components and software-based algorithms.

Although specific features of the invention are shown in some drawings and not in others, this is for convenience only as each feature may be combined with any or all of the other features in accordance with the invention.

Other embodiments will occur to those skilled in the art and are within the following claims:

What is claimed is:

1. An automated valuation system comprising:
a database storing one or more feature elements and an offered price for each of a plurality of specimens;
a comparative valuation device for generating a plurality of valuation coefficients using said one or more feature elements and said offered price for each of said plurality of specimens, the valuation coefficients indicative of the actual value of each of said plurality of specimens;
all actual value calculator for calculating the actual value of each of said plurality of specimens using a best-fit equation, wherein said plurality of valuation coefficients include a y-intercept and one or more slopes of the best-fit equation;
a price comparator for comparing, for each of said plurality of specimens, the actual value of a specimen to the offered price of that specimen to determine a cost indicator, wherein said cost indicator is indicative of the amount that said offered price differs from said actual value; and
a feature weighting device for generating a correlation factor for each feature element, indicative of the impact that a feature element has on said actual value of each of said plurality of specimens.

2. The automated valuation system of claim 1 wherein said comparative valuation device includes an offered price averaging system for determining an average offered price for said plurality of specimens.

3. The automated valuation system of claim 2 wherein said comparative valuation device includes a feature element averaging system for determining an average first feature element value for said plurality of specimens.

4. The automated valuation system of claim 3 wherein said comparative valuation device includes a feature element square summing device for mathematically squaring each first feature element and summing these squared first feature elements, thus producing a first feature element squared sum.

5. The automated valuation system of claim 4 therein said comparative valuation device includes a product summing device for determining, for each of said plurality of specimens, the product of said offered price and said first feature element, and summing these products to produce a first feature element product sum.

6. The automated valuation system of claim 5 wherein said comparative valuation device utilizes said average offered price, said average first feature element value, said first feature element squared sum, and said first feature element product sum, to determine said plurality of valuation coefficients.

7. The automated valuation system of claim 1 wherein said comparative valuation device includes a simultaneous equation generation system for generating a plurality of simultaneous equations indicative of said plurality of valuation coefficients.

8. The automated valuation system of claim 1 wherein said database stores at least one additional feature element for each of said plurality of specimens, said comparative valuation device generates an additional valuation coefficient for each said additional feature element.

9. The automated valuation system of claim 1 wherein said database stores at least one additional feature element for each of said plurality of specimens, said comparative valuation device generates an additional valuation coefficient for each said additional feature element.

10. A computer implemented method of automatically determining the actual value for each of a plurality of specimens, comprising the steps of:
generating, through the use of a first feature element and an offered price stored in a database for each of a plurality of specimens, a plurality of valuation coefficients that are indicative of the actual value of each of the plurality of specimens;

calculating, through the use of the plurality of valuation coefficients, the actual value of each of the plurality of specimens using a best-fit equation, wherein said plurality of valuation coefficients include a y-intercept and one or more slopes of the best-fit equation;

comparing, for each of the plurality of specimens, the actual value of the specimen to the offered price of the specimen to determine a cost indicator, wherein the cost indicator is indicative of the amount that the offered price of a specimen differs from the actual value of a specimen, thereby informing a purchasing decision of a prospective buyer; and generating a correlation factor for each feature element, indicative of the impact that a feature element has on the actual value of each of the plurality of specimens.

11. The method of claim 10 further including the step of generating, in response to each specimen including additional feature elements, an additional valuation coefficient for each additional feature element.

12. A processor and memory configured to perform the steps of:

generating, through the use of a first feature element and an offered price stored in a database for each of a plurality of specimens, a plurality of valuation coefficients that are indicative of the actual value of each of the plurality of specimens;

calculating, through the use of the plurality of valuation coefficients, the actual value of each of the plurality of specimens using a best-fit equation, wherein said plurality of valuation coefficients include a y-intercept and one or more slopes of the best-fit equation;

comparing, for each of the plurality of specimens, the actual value of the specimen to the offered price of the specimen to determine a cost indicator, wherein the cost indicator is indicative of the amount that the offered price of a specimen differs from the actual value of a specimen; and generating a correlation factor for each feature element, indicative of the impact that a feature element has on the actual value of each of the plurality of specimens.

13. The processor and memory of claim 12 wherein said processor and memory are incorporated into a personal computer.

14. The processor and memory of claim 12 wherein said processor and memory are incorporated into a programmable logic controller.

15. The processor and memory of claim 12 wherein said processor and memory are incorporated into a single board computer.

16. The processor and memory of claim 12 wherein said processor and memory are incorporated into an array of network servers.

17. A computer readable medium having a plurality of instructions stored thereon which, when executed by the processor, cause that processor to perform the steps of:

generating, through the use of a first feature element and an offered price stored in a database for each of a plurality of specimens, a plurality of valuation coefficients that are indicative of the actual value of each of the plurality of specimens;

calculating, through the use of the plurality of valuation coefficients, the actual value of each of the plurality of specimens using a best-fit equation, wherein said plurality of valuation coefficients include a y-intercept and one or more slopes of the best-fit equation;

comparing, for each of the plurality of specimens, the actual value of the specimen to the offered price of the specimen to determine a cost indicator, wherein the cost indicator is indicative of the amount that the offered price of a specimen differs from the actual value of a specimen; and generating a correlation factor each feature element, indicative of the impact that a feature element has on the actual value of each of the plurality of specimens.

18. The computer readable medium of claim 17 in which said computer readable medium is a hard drive.

19. The computer readable medium of claim 17 in which said computer readable medium is one of a read-only memory and random-access memory.

* * * * *